United States Patent [19]

Nishikawa et al.

[11] 4,179,488
[45] * Dec. 18, 1979

[54] METHOD OF MAKING A FROSTED BOTTLE OF SATURATED POLYESTER

[75] Inventors: Masanori Nishikawa, Tochigi; Masao Hattori, Hatano, both of Japan

[73] Assignee: Yoshino Kogyosho Co., Ltd., Tokyo, Japan

[*] Notice: The portion of the term of this patent subsequent to Aug. 14, 1996, has been disclaimed.

[21] Appl. No.: 830,864

[22] Filed: Sep. 6, 1977

Related U.S. Application Data

[62] Division of Ser. No. 779,473, Mar. 21, 1977.

[30] Foreign Application Priority Data

Mar. 31, 1976 [JP] Japan .................................. 51/36636

[51] Int. Cl.² .............................................. B29C 17/07
[52] U.S. Cl. ...................... 264/521; 264/535
[58] Field of Search ............. 264/89, 94, 96–99, 264/327, 521, 523, 535, 537, 538–543; 215/1 C; 425/526

[56] References Cited

U.S. PATENT DOCUMENTS

| 3,496,258 | 2/1970 | Wiley | 264/98 X |
| 3,803,275 | 4/1974 | Corsover | 264/98 X |
| 3,821,349 | 6/1974 | Mozer | 264/99 X |
| 3,822,332 | 7/1974 | Hrach et al. | 264/97 |
| 3,849,530 | 11/1974 | Wyeth et al. | 264/98 X |
| 4,036,927 | 7/1977 | Stolki | 264/97 |
| 4,042,657 | 8/1977 | Ostapchenko et al. | 264/97 X |

FOREIGN PATENT DOCUMENTS

| 2312733 | 9/1973 | Fed. Rep. of Germany | 264/97 |
| 1051974 | 12/1966 | United Kingdom | 264/98 |

Primary Examiner—Jan H. Silbaugh

[57] ABSTRACT

One of the main objectives of the present invention is to provide a frosted bottle made of an unsaturated polyester, and another object thereof is to provide a method of making such the frosted bottle.

The bottle according to the present invention is made from a cylindrical material prepared by injection moulding and having a bottom wall and a transparent upper portion in the vicinity of the opening thereof. The peripheral outer surface of the cylindrical material is heated to allow the outer surface for becoming milky white, and then put into a mould for blow mounding to inflate the trunk and bottom walls other than the neck portion thereby for forming a bottle. The bottles according to the present invention which are not particularly colored are, therefore, characterized by having walls which are composed of inner transparent portions and opaque outer pheripheral portions of milky white color, when viewed in cross sections.

3 Claims, 6 Drawing Figures

METHOD OF MAKING A FROSTED BOTTLE OF SATURATED POLYESTER

This is a division of application Ser. No. 779,473 filed Mar. 21, 1977.

BACKGROUND OF THE INVENTION

It is sometimes desirous to color bottles or to make them translucent or opague in order to improve their appearances. Conventionally known methods of making such the translucent or opaque bottles, i.e. the frosted bottles, of synthetic resins are to use a mould having a roughened inner surface provided with numerous minute scars or scratches, or to corrode the surface of a transparent bottle. However, the bottles made by any of the conventional methods described above have disadvantages that minute projections and recesses are formed on the surfaces thereof similarly as ground glasses to become unpleasant to the touch followed by accompanying inconvenience of being easily soiled due to adhesions of dusts and oily soils transferred from hands into the recesses or on the projections, and that the appearances thereof are spoiled since luster of the surfaces have been lost. Moreover, said roughened mould is expensive since complicated operations are required to manufacture the same, which results in increase in production cost of the moulded bottle.

SUMMARY OF THE INVENTION

The present invention is made by aiming at and taking use of the fact that saturated polyester resins are caused to be crystallized within the temperature range of crystallization temperature ($T_{cc}$) and higher than the glass transition temperature ($T_g$), if specific interrelation is established between the temperature and time, for making bottles.

The primary object of the present invention is, therefore, to produce a frosted bottle at low cost.

A further object of the invention is to make it possible to produce bottles of different frosted degrees as desired.

Another object of the invention is to make it easy to produce a bottle which has a transparent upper portion forming the neck portion thereof and frosted lower portion of generally milky white color except where the molten material is intentionally colored.

Yet a further object of the present invention is to provide a frosted bottle having improved dimensional and thermal stabilities by producing it by biaxial orientation characterized in that the trunk and bottom portions are expanded two-dimensionally. Other objects and advantages of the present invention will be apparent from the detailed description of the invention.

DETAILED DESCRIPTION OF THE INVENTION

Figure 1:
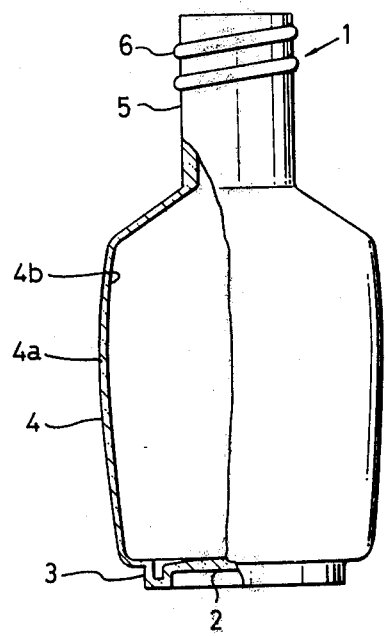
FIG. 1 is a front view of a bottle of an saturated polyester resin made in accordance with the present invention with portions broken away.
Figure 2:
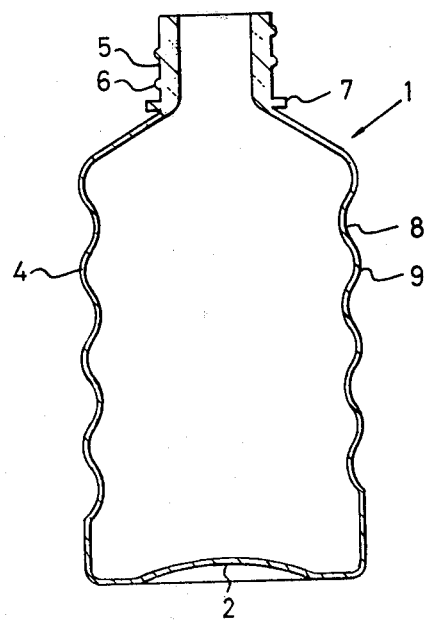
FIG. 2 is a cross sectional view of another embodiment.
Figure 3:
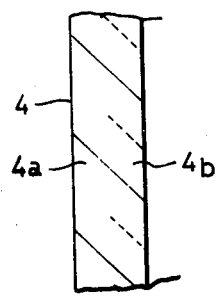
FIG. 3 is an enlarged view showing the trunk portion of the bottle.

In the drawings, reference numeral 1 shows a bottle of an saturated polyester resin made in accordance with the present invention and having a bottom wall 2, an annular leg 3 protruding downwardly from the under surface of the bottom wall 3, a trunk portion 4, and a neck portion 5 provided with a threaded portion 6 for meshing with a cap. As shown in FIG. 2, an outwardly protruding flange 7 may be disposed on the base of the neck portion 5 for engaging with the lower edge of the cap. In order to increase stiffness of the trunk portion 4 when the thickness of the trunk wall is extremely thin, a plurality of concaved and projecting stripes 8 and 9 may be alternatively provided on the peripheral surface of the trunk portion. In general, the overall outer surface of the bottle 1 is frosted or made to have a ground glass like condition, whereas the other portions, i.e. the portions internally of the outer surface are transparent. However, the outer surface of the neck portion may be transparent, if desired, and the transparent area may be extended such that the upper half of the trunk portion may be transparent.

The bottle having the construction as described above may be moulded in the following manner. Firstly, a transparent cylindrical material 11 which has a bottom wall and a top opening and made of an saturated polyester resin is prepared by injection moulding. In the process of preparing the cylindrical material, it is required to suddenly cool the material to room temperature at a cooling speed high enough to avoid occurence of crystallization, since crystallization occurs if it is cooled too slowly from the moulding temperature after it is moulded. The cooling speeds commonly employed in general injection moulding operations are well suited for the sudden cooling speed mentioned above. The portion of the material corresponding to the neck portion 15 is not necessarily expanded by inflation as the portions corresponding to the trunk 14 and the bottom wall 12, but it is only required to be provided with the threaded portion 6 and the outwardly protruding flange 7 for forming the neck portion of the bottle, if desired.

Figure 5:
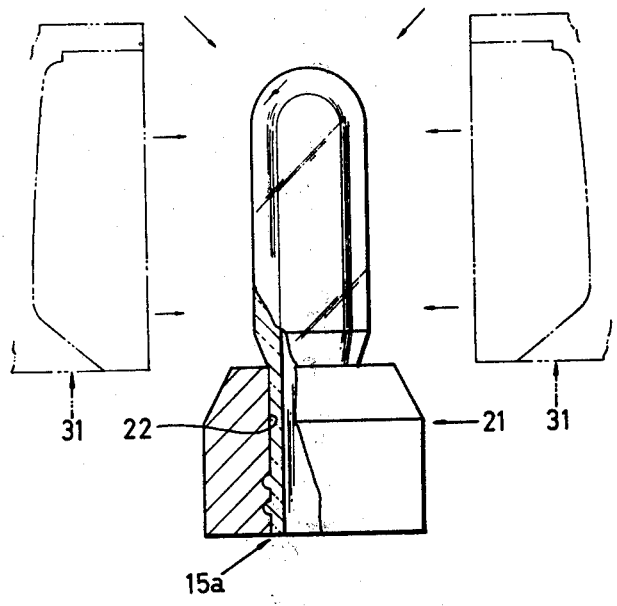
FIG. 5 is a front view of the cylindrical material fitted to a support member with portions broken away.
Figure 4:
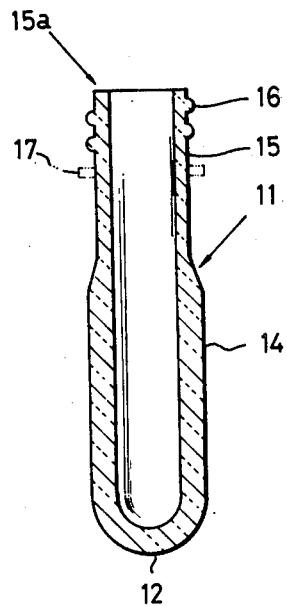
FIG. 4 is a cross sectional view of a cylindrical material which is used as the intermediate product for forming the bottle of the invention.
Figure 6:
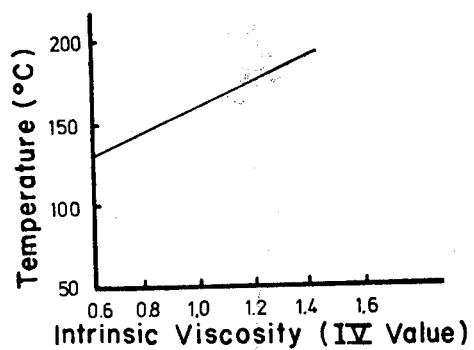
FIG. 6 is a graph showing the crystallization phenomenon of an saturated polyester resin in terms of the temperature and the intrinsic viscosity (IV value).

The overall outer surfaces of the cylindrical material or the outer surfaces of the trunk and bottom walls thereof, as shown in FIG. 5 by inserting the port portion 15a into an insertion hole 22 of a suitable support member 21, are heated from the outside to a temperature in the range of higher than the glass transition temperature ($T_g$) of the material and lower than the crystallization temperature ($T_{cc}$) by means of a heat source such as a heater. Saturated polyester resins are crystallized produce a milky-white color if they are heated at a temperature higher than $T_g$ under the conditions at which specific interrelations are established between the temperature and time. In view of this fact, the material used is heated to a temperature at which the outer surface is crystallized and the internal portion thereof is not yet crystallized but can be inflated or expanded to cause biaxial orientation. The values of $T_g$ in general of the saturated polyesters are about 70° C., and the values of $T_{cc}$ are varied depending on the intrinsic viscosities (IV values) of individual materials and may be diagramatically shown by the exemplary temperature graph in FIG. 6. Consequently, it is theoretically possible to practise the present invention at any temperature included in the defined temperature range. However, it is preferable to heat the material at a temperature close to $T_{cc}$ for allowing it to be crystallized for a short period of time thereby for improving production efficiency, and heat treatment at a temperature close to $T_g$ is thus inconvenient since a prolonged time period is required for causing the crystallization phenomenon.

According to our empirical studies, advantageous results were obtained both in case where a cylindrical material having a trunk of 2.8 mm thickness and the IV value of 0.65 was heated to have the outer surface temperature of 130° C. for 90 sec., and in case where a cylindrical material having a trunk of 6 mm thickness and the IV value of 1.5 was heated to have the outer surface temperature of 200° C. for 162 sec.

If the heating time is too long, the crystallization starting from the outer surface extends onto the inner surface for crystallizing the whole body, so that the material is deprived of its elasticity to become more difficult to form a bottle by blow moulding. Preferably, the crystallization is extended onto the substantially middle portion in the direction traversing the wall. Inflationability or ductility of the material is lowered, as the volume of the portion not crystallized decreases.

The material heated to reach the state mentioned immediately before is then transferred into a mould 31 for blow moulding, and the mould is clamped, and thereafter blowing is effected to form the bottle 1. The cyrindrical material having the crystallized outer surface is expanded two-dimensionally while keeping the condition of the wall just as it is, whereby a frosted bottle having a crystallized outer surface is produced.

A bottle having the crystallized outer surface in its entirety may be formed by the process comprising the steps of crystallizing the overall outer surface of a cylindrical material by supporting it by the use of a support member which does not cover the outer peripheral surface of the neck portion, for instance by inserting a support member into the neck portion; and moulding the thusly crystallized material by blow moulding operation. On the other hand, a transparent neck portion may be formed if the portion corresponding to the neck portion is inserted into a support member 21 as shown in FIG. 5 to be covered with the support member and to be shielded from heat in the heating step before the blow moulding operation. In the outer surface of the interface region between the crystallized portion at the trunk side and the transparent neck portion, the opaque color is gradually gradated to be transparent, such gradation being due to the conducted heat.

In general, only the neck portion which is inserted into a support member and not caused to be crystallized is transparent. However, the transparent region may be extended, for instance, by attaching a heat shielding plate to the support member. It is possible to form a bottle having a transparent neck portion and a trunk portion the upper half of which is transparent and the lower half of which is gradated in color. Further, the degree of gradation may be lighter or deeper depending upon the degree of crystallization which may be varied by adjusting the interrelations between the heating temperature, the heating time and the IV value.

What is claimed is:

1. A method of making a frosted bottle of a saturated polyester resin comprising the steps of:
    preparing an uncrystallized transparent cylinder of a saturated polyester resin formed by injecting molding and having a bottom wall and upper opening;
    heating said cylinder from only the outside thereof at a predetermined temperature above the glass transition temperature for a predetermined time such that, through the thickness, only an outer fraction of the cylinder is crystallized, the interior of the cylinder being at a lower temperature due to the temperature gradient across the thickness of the cylinder such that the interior of the cylinder is maintained to be uncrystallized and transparent;
    placing the heated and differentially crystallized cylinder in a mold, and
    subsequently blow-molding said cylinder at a temperature suitable for biaxial orientation upon inflation to form said frosted bottle.

2. The method as claimed in claim 1, wherein the neck portion of said cylinder is inserted into an insertion hole of a support member, and the exposed portion which is not inserted into said insertion hole is subjected to heating, whereby the neck portion does not reach said higher temperature and is not crystallized.

3. Method of blow-molding a bottle of saturated polyester resin having a bottom wall, a trunk portion, and a neck portion, wherein at least a part of the trunk portion changes gradually from a crystallized state at the exterior surface to a transparent state at the inner surface, said method comprising the steps of:
    providing an uncrystallized parison of saturated polyester resin for blow-molding into said bottle,
    heat-treating from the outside that portion of said parison from which at least a part of said trunk portion is to be formed, to a predetermined temperature above the glass transition temperature and below the crystallization temperature,
    maintaining said heat-treating step for a predetermined period of time to provide on said part of said trunk portion a gradual change of said structural state, in cross-section, from a cyrstallized state at the exterior surface to a transparent state at the inner surface, and
    subsequently blow-molding said heat-treated parison into a bottle having a bottom wall, a trunk portion with an crystallized exterior on at least a part thereof and a neck portion.

* * * * *